United States Patent
Li et al.

(10) Patent No.: US 12,540,657 B2
(45) Date of Patent: Feb. 3, 2026

(54) MOTOR DRIVING STRUCTURE AND MOTOR DRIVING DEVICE

(71) Applicant: Remacro Technology Co., Ltd., Jiangsu (CN)

(72) Inventors: Jin Li, Jiangsu (CN); Yuqin Xue, Jiangsu (CN)

(73) Assignee: Remacro Technology Co., Ltd., Suzhou (CN)

( * ) Notice: Subject to any disclaimer, the term of this patent is extended or adjusted under 35 U.S.C. 154(b) by 0 days.

(21) Appl. No.: 18/434,791

(22) Filed: Feb. 6, 2024

(65) Prior Publication Data

US 2024/0175483 A1 May 30, 2024

Related U.S. Application Data

(63) Continuation of application No. PCT/CN2022/110501, filed on Aug. 5, 2022.

(30) Foreign Application Priority Data

Aug. 10, 2021 (CN) .......................... 202110915590.0
Aug. 10, 2021 (CN) .......................... 202110915599.1

(51) Int. Cl.
 *F16H 25/20* (2006.01)

(52) U.S. Cl.
 CPC ..... *F16H 25/20* (2013.01); *F16H 2025/2031* (2013.01); *F16H 2025/2084* (2013.01); *F16H 2025/209* (2013.01)

(58) Field of Classification Search
 CPC .............. F16H 25/20; F16H 2025/209; F16H 2025/2031; F16H 2025/2081; F16H 2025/2084
 See application file for complete search history.

(56) References Cited

U.S. PATENT DOCUMENTS

| | | | |
|---|---|---|---|
| 10,527,137 B2 * | 1/2020 | Oster | ...................... F16H 25/20 |
| 2019/0032389 A1 | 1/2019 | Oster et al. | |
| 2019/0195323 A1 * | 6/2019 | Lu | ........................ F16H 25/2454 |

(Continued)

FOREIGN PATENT DOCUMENTS

| | | |
|---|---|---|
| CN | 103812266 A | 5/2014 |
| CN | 204947825 U | 1/2016 |

(Continued)

OTHER PUBLICATIONS

CN-213072330-U (Year: 2021).*

(Continued)

*Primary Examiner* — Randell J Krug (57) ABSTRACT

Disclosed are a motor driving structure and a motor driving device. The motor driving structure includes a driving mechanism, wherein the driving mechanism includes a lead screw, a nut, a push rod, and a capping head; the lead screw is used to be drivingly connected with an output end of a motor; the nut is threaded to the lead screw and used for connecting the lead screw with the push rod; the push rod is positioned between the nut and the capping head; the push rod is integrally formed with the nut and/or the capping head; the push rod is made of a plastic material; and the nut integrated with the push rod and/or the capping head integrated with the push rod are/is made of a plastic material.

16 Claims, 6 Drawing Sheets

(56) References Cited

U.S. PATENT DOCUMENTS

2020/0072328 A1* 3/2020 Zhou .................. F16H 57/0498
2020/0393028 A1* 12/2020 Mengel ................. A61G 7/018

FOREIGN PATENT DOCUMENTS

| | | | | |
|---|---|---|---|---|
| CN | 206283378 U | | 6/2017 | |
| CN | 107830136 A | | 3/2018 | |
| CN | 207796016 U | | 8/2018 | |
| CN | 208364722 U | | 1/2019 | |
| CN | 210404975 U | * | 4/2020 | |
| CN | 111342608 A | * | 6/2020 | ........... H02K 5/1737 |
| CN | 213072330 U | * | 4/2021 | |
| DE | 202021100014 U1 | | 1/2021 | |

OTHER PUBLICATIONS

International search report of PCT Patent Application No. PCT/CN2022/110501 issued on Oct. 27, 2022.
Extended European Search Report of European Patent Application No. 22855343.4 issued on Feb. 13, 2025.

\* cited by examiner

MOTOR DRIVING STRUCTURE AND MOTOR DRIVING DEVICE

CROSS-REFERENCE TO RELATED APPLICATIONS

The present application is a Continuation Application of PCT Application No. PCT/CN2022/110501 filed on Aug. 5, 2022, which claims priority of Chinese Patent Applications No. 202110915590.0 filed on Aug. 10, 2021, and No. 202110915599.1 filed on Aug. 10, 2021 before CNIPA. All the above are hereby incorporated by reference in their entirety as part of the present disclosure.

FIELD

The present disclosure relates to the technical field of furniture drives and, particularly, to a motor driving structure and motor driving device.

BACKGROUND

With the continuous updating and development of intelligent households, people's requirements for furniture are also increasingly high. Considering the space occupied by the furniture, the motor driving device adopted on the furniture is also increasingly simplified, requiring increasingly high requirements for its production precision. However, in the prior art, the number of components of the motor driving device is numerous and the volume thereof is small. More time is required for processing and assembling to ensure precision and matching, resulting in a long production period and cumbersome assembly. Moreover, even some of the components may generate relatively high decibel noise and wear when assembled and used, resulting in the low performance of the motor driving device, insufficient durability and other shortcomings. Therefore, a motor driving structure and a motor driving device are required to simplify the processing and assembly steps and to improve productivity and assembly efficiency.

In addition, in order to reduce the occupied space, the size of the components of the existing motor driving device is also extremely fine, which to a certain extent increases the difficulty of components processing, and also requires a higher degree of matching when assembling, which is not conducive to rapid assembly. Also, the reduction of the size of the components is also, to a certain extent, sacrificed to structural strength, but instead requires additional parts in order to ensure sufficient structural strength.

For example, in the motor driving device of the prior art, a length of the whole driving mechanism is relatively long after the lead screw of the driving mechanism is threaded to the push rod. However, the protective assembly out of the driving mechanism is generally a relatively short structure, which may only cover a small part of the lead screw. An additional tubular protective sleeve is provided between the protective assembly and the driving mechanism to protect the lead screw and the push rod. In order to fix the protective cover, a fixing buckle is required to be provided to connect with an external protective assembly. The number of components is large, and the structure is relatively complex, which not only requires an additional production process for the protective sleeve but also requires an additional assembly process for the protective sleeve. Since the protective sleeve is provided between the driving mechanism and the protective assembly, it is also necessary to assemble the protective sleeve to the driving mechanism before assembling the protective assembly on the outside of the protective cover, which results in cumbersome steps and slows down production speeds. Additionally, the existing protective sleeve is often made of aluminum tube, which requires high processing technique and leads to high production costs for the motor driving device.

Therefore, a motor driving structure and a motor driving device are required, capable of ensuring structural strength, while further simplifying the structure, improving structural compactness and reducing structural complexity, as well as reducing production difficulty and improving production efficiency.

SUMMARY

Provided in the present disclosure is a motor driving structure, including a driving mechanism, in which the driving mechanism includes a lead screw, a nut, a push rod, and a capping head; the lead screw is used to be drivingly connected with an output end of a motor; the nut is threaded to the lead screw and used for connecting the lead screw with the push rod;

the push rod is positioned between the nut and the capping head; the push rod is integrally formed with the nut and/or the capping head; the push rod is made of a plastic material; and the nut integrated with the push rod and/or the capping head integrated with the push rod are/is made of a plastic material.

Further, the push rod is injection molded integrally with the nut and/or the capping head.

Further, the motor driving structure further includes a housing; an interior of the housing is provided with an accommodating chamber; and at least a part of the driving mechanism is provided within the accommodating chamber.

Further, the housing includes a first protective housing and a second protective housing; the first protective housing is fixedly connected with the second protective housing; and the accommodating chamber is enclosed by an interior surface of the first protective housing and an interior surface of the second protective housing.

Further, the driving mechanism further comprises a driving gear; the driving gear is used to engage with the motor; and the driving gear is coaxially connected to the lead screw.

Further, the driving mechanism further comprises a bearing; the bearing is provided on an end of the driving mechanism; and the bearing is positioned on a side of the driving gear distal to the push rod.

Further, the push rod is further provided with a protective sleeve on an outer periphery; an end of the protective sleeve is fixed in the accommodating chamber; and an opposite end of the protective sleeve is protruded out of an end surface of the housing.

Further, the protective sleeve is protruded out of an end of the lead screw distal to the motor.

Further, the driving mechanism further includes a fixing member; an interior periphery of the fixing member is supported on an outer side of the screw; and an exterior part of the fixing member is simultaneously supported on an interior periphery of the housing and an interior periphery of the protective cover.

Further, the motor driving structure further includes a switch assembly; the switch assembly is provided with a fixing plate and at least one control switch; the fixing plate is fixedly connected to the protective cover; and the control switch is used to control operation of the driving mechanism.

Provided in the present disclosure is also a motor driving device, including a motor and a motor driving structure mentioned above, in which the motor is used to provide power to the driving mechanism; an output end of the motor is provided with an output shaft; a housing is provided out of the driving mechanism; the housing is provided with a perforation; and the output shaft is passed through the perforation to be drivingly connected to the lead screw.

Further, the motor is provided perpendicular to the driving mechanism.

Further, an end of the motor is provided with a protective cover shell, and the protective cover shell is sheathed on an end of the motor distal to the driving mechanism.

In accordance with another aspect of the present disclosure, in view of the above existing problems in the prior art, the present disclosure provides a motor driving structure and a motor driving device, capable of ensuring structural strength while further reducing the structural complexity, lowering the number of components and the production difficulty, and improving the production efficiency.

Provided in the present disclosure is a motor driving structure, including a driving mechanism and a reinforcing protective assembly; an interior of the reinforcing protective assembly is provided with an accommodating chamber; the driving mechanism is provided in the accommodating chamber; an outer periphery contour of the driving mechanism matches an inner periphery contour of the accommodating chamber;

the driving mechanism includes a lead screw and a push rod; the lead screw is used to be drivingly connected with an output end of a motor; the push rod is connected to the lead screw by means of internal and external threads;

an end of the reinforcing protective assembly distal to the motor further includes a support part; the support part is positioned on an interior periphery of the reinforcing protective assembly; and the support part is supported on an outer side of the push rod.

Further, the support part is a first support ring, and the first support ring is provided between the push rod and the reinforcing protective assembly.

Further, an end of the reinforcing protective assembly distal to the motor is protruded out of an end of the lead screw distal to the motor.

Further, the driving mechanism includes a driving gear and a nut; the driving gear is used to engage with the motor; the driving gear is coaxially connected to the lead screw; and the nut is used to connect the lead screw and the push rod.

Further, the driving mechanism further includes a second support ring provided on the lead screw, and the second support ring is positioned between the driving gear and the nut.

Further, the driving mechanism further comprises a bearing; the bearing is provided on an end of the driving mechanism; and the bearing is positioned on a side of the driving gear distal to the push rod.

Further, a length of the accommodating chamber is not less than a distance from the support part to the bearing.

Preferably, the nut and the push rod are of integral structure.

Further, the driving mechanism further comprises a capping head, and the capping head is positioned on an end of the push rod distal to the motor.

Preferably, the capping head and the push rod are of integral structure.

Further, the reinforcing protective assembly includes a first protective housing and a second protective housing; the first protective housing is fixedly connected to the second protective housing; the accommodating chamber is enclosed by an interior surface of the first protective housing and an interior surface of the second protective housing.

Further, the motor driving structure further includes a switch assembly; the switch assembly is provided with a fixing plate and at least one control switch; the fixing plate is fixedly connected to the reinforcing protective assembly; and the control switch is used to control operation of the driving mechanism.

Provided in the present disclosure is also a motor driving device, including a motor and a motor driving structure mentioned above, in which the motor is used to provide power to the driving mechanism; an output end of the motor is provided with an output shaft; the reinforcing protective assembly is provided with a perforation; and the output shaft is passed through the perforation to be drivingly connected to the lead screw.

Further, the motor is provided perpendicular to the driving mechanism.

Further, an end of the motor is provided with a protective cover shell, and the protective cover shell is sheathed on an end of the motor distal to the driving mechanism.

BRIEF DESCRIPTION OF THE DRAWINGS

In order to illustrate the technical solutions of the present disclosure more clearly, the following drawings are briefly introduced in the embodiments, in which identical parts or components are indicated by the same markings as in the attached drawings. Obviously, the following drawings illustrate only some of the embodiments of the present disclosure. Other relevant drawings may be obtained on the basis of these drawings without any creative effort by those skilled in the art.

The attached markings in the figure correspond to: 1 driving mechanism; 11 bearing; 12 driving gear; 13 lead screw; 14 fixing member; 14' second support ring; 15 nut; 16 push rod; 17 capping head; 2 housing; 2' reinforcing protective assembly; 21 first protective housing; 22 second protective housing; 23 accommodating chamber; 24 support part; 3 switch assembly; 31 fixing plate; 32 control switch; 4 motor; 41 output shaft; 42 protective cover shell; 5 protective cover; 5' first support ring.

DETAILED DESCRIPTION OF THE EMBODIMENTS

The technical solutions in the embodiments of the present disclosure are clearly and completely described below in conjunction with the attached drawings in the embodiments of the present disclosure. It should be noted that the terms "up", "down", "left", "right", "inside", "outside", "front", "back", "both ends", "an end", "an opposite end" and other orientation or position relationships are based on the orientation or position relationships shown in the attached drawings. It is only intended to facilitate description of the present disclosure, but not to indicate or imply that the referred device or structure has a specific orientation, or is constructed and operated in a specific orientation. Therefore, they should not be construed as a limitation of the present disclosure. Additionally, the embodiments described herein are only some of the embodiments of the present disclosure but not all of them. Based on the embodiments in the present disclosure, all other embodiments obtained by those skilled in the art without creative efforts fall within the scope of protection of the present disclosure.

In accordance with an aspect of the present disclosure, in view of the above existing problems in the prior art, the present disclosure provides a motor driving structure and a motor driving device to simplify the processing and assembling steps, and to improve the production efficiency and the assembling efficiency.

Embodiment

Figure 1:
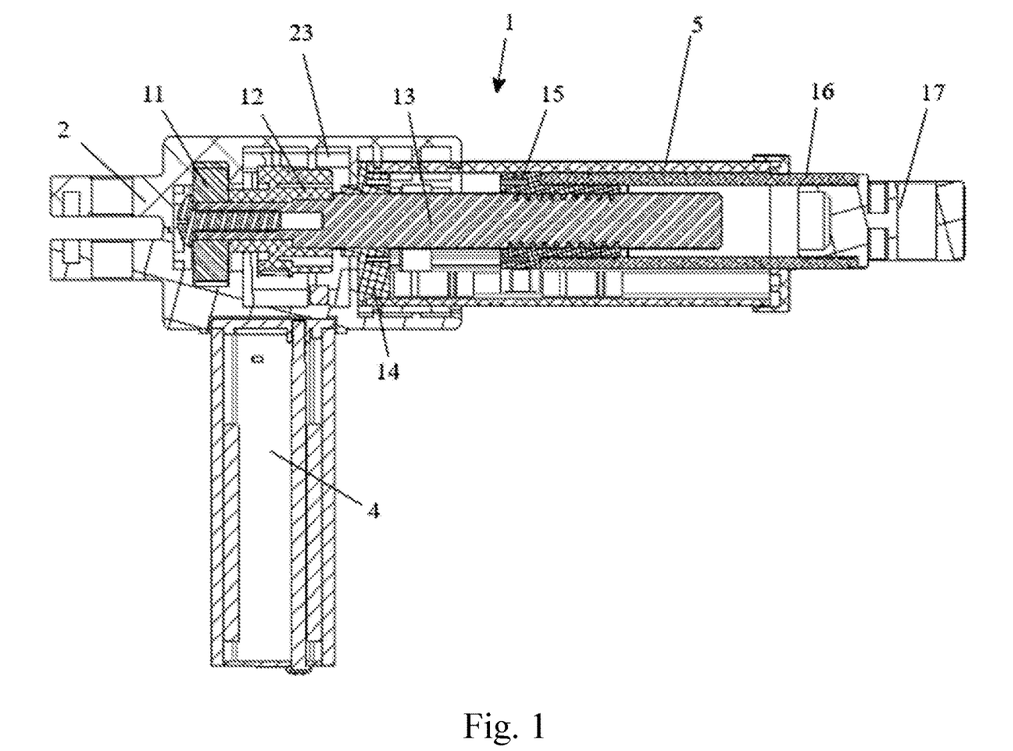
FIG. 1 is a structural cross-sectional diagram of the motor driving structure of an embodiment in the present disclosure.
Figure 2:
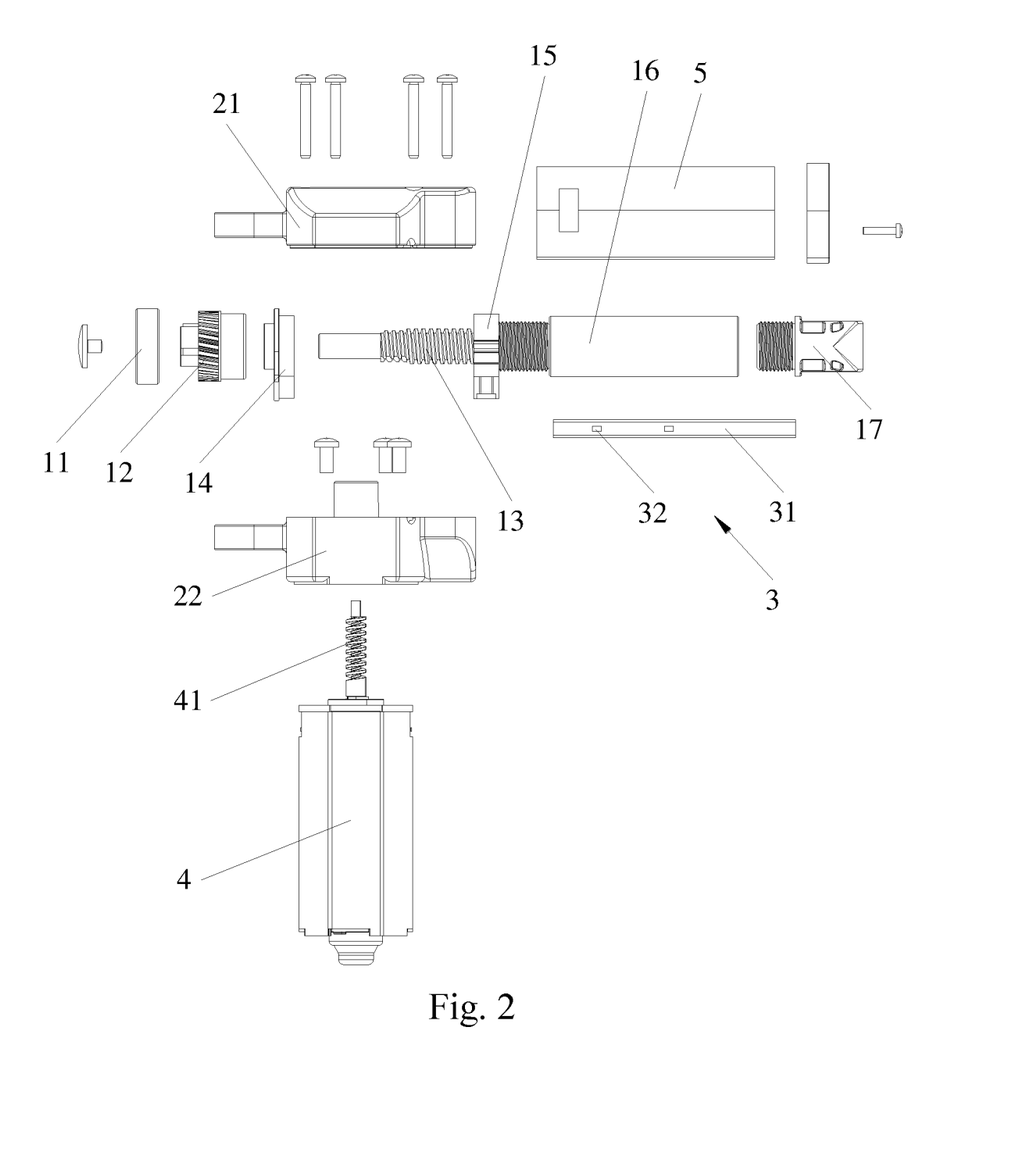
FIG. 2 is an exploded view of the motor driving structure in FIG. 1.

Considering that the existing motor driving device suffers from a complex structure, large number of parts, and cumbersome assembly, provided in the present embodiment is a motor driving structure. As shown in FIGS. 1-2, the motor driving structure includes a driving mechanism 1 and a housing 2, in which the driving mechanism 1 is used to be drivingly connected to an end of a motor 4 and is provided in the housing 2. An interior of the housing 2 is an accommodating chamber 23 used to accommodate the driving mechanism 1, which also facilitates a better guiding role during assembly, allows for rapid positioning and improves assembly efficiency.

Specifically, as shown in FIG. 1, FIG. 1 is a structural cross-sectional diagram of the motor driving structure of the present embodiment, in which the driving mechanism 1 includes a lead screw 13, a nut 15, a push rod 16, and a capping head 17. An end of the lead screw 13 is used to be drivingly connected to an output end of the motor 4, so that the motor 4 drives the lead screw 13 to rotate when activated. On an opposite end of the lead screw 13, the push rod 16 is connected to the lead screw 13 through the nut 15. When the lead screw 13 rotates, it also drives the push rod 16 to move. Moreover, an end of the push rod 16 is protruded out of an end of the housing 2, so that the push rod 16 outputs the power.

The nut 15 is positioned at an end of the lead screw 13 and the push rod 16. The lead screw 13 and the push rod 16 are fixedly secured by a threaded connection, which provides a high degree of fixation reliability. In a possible implementation of the present disclosure, the nut 15 may be provided to be integrated with the push rod 16, so that there is no necessity of processing connecting threads and other connecting structures at the connection place between the nut 15 and the push rod 16 when processing them. Directly forming the nut 15 and the push rod 16 integrally reduces the difficulty of processing, and also further accelerates the production and assembly efficiency.

Specifically, as shown in FIG. 1, the capping head 17 is positioned on an end of the push rod 16 distal to the motor 4. The capping head 17 may be integrated with the push rod 16. Therefore, there are three types of connection forms for the nut 15, the push rod 16 and the capping head 17 as follows: the nut 15 is integrated with the push rod 16, but the push rod 16 is not integrated with the capping head 17; the push rod 16 is integrated with the capping head 17, but the push rod 16 is not integrated with the nut 15; and the nut 15 is integrated with the push rod 16 and the push rod 16 is also integrated with the capping head 17, i.e., the nut 15, the push rod 16, and the capping head 17 are formed integrally. Whatever of the above connection forms is used for integral molding, it reduces the processing difficulty and greatly accelerates the processing and assembly efficiency.

Specifically, the material of the push rod 16 is plastic. When the push rod 16 and the nut 15 are formed integrally, the material of the nut 15 must be the same as that of the push rod 16, i.e., plastic. However, the material of the capping head 17 may be plastic or metal. That is, the material of the capping head 17 does not depend on the push rod 16 is formed integrally with the nut 15. Similarly, when the push rod 16 and the capping head 17 are formed integrally, the material of the capping head 17 must be the same as that of the push rod 16, i.e., plastic. However, the material of the nut 15 may be plastic or metal. That is, the material of the nut 15 does not depend on the push rod 16 is formed integrally with the capping head 17. When the nut 15, the push rod 16, and the capping head 17 are formed integrally, the material of the nut 15 and the capping head 17 must be the same as that of the push rod 16, i.e., plastic. In a possible implementation of the present disclosure, the push rod 16 is formed integrally with the nut 15 and/or the capping head 17 in an integrally injection-molded manner, which requires only pre-preparation of the corresponding molds for rapid processing, reducing processing difficulty and improving processing efficiency and subsequent assembly efficiency. For example, when the nut 15, the push rod 16, and the capping head 17 are formed integrally, a complete part is obtained by injection molding in a single molding, eliminating the necessity of assembling the nut 15 to the push rod 16 and assembling the capping head 17 to the push rod 16 by the threads of the connection place. Moreover, friction, jamming, and noise caused by the original metal parts with the surrounding parts during assembly or operation are greatly reduced by adopting plastic materials, which improves the smoothness of rotation and enhances the mechanical performance of the motor driving structure as well as the customer's satisfaction.

Specifically, as shown in FIGS. 1-2, the driving mechanism 1 further includes a driving gear 12 used to engage with an output end of the motor 4 to transmit the power of the motor 4. The driving gear 12 provided by the present embodiment is coaxially connected to the lead screw 13 directly, in which the driving gear 12 is directly sheathed on the lead screw 13 to be secured, which, on the one hand, simplifies the structure and improves the assembly efficiency, and, on the other hand, avoids instability of the driving mechanism 1 caused by adding additional parts. Preferably, in a possible implementation of the present disclosure, the driving gear 12 may be threaded to an end of the lead screw 13, which provides a simple and rapid connection, and the detachable threaded connection is conducive to replacing parts during maintenance, since it is sufficient to only replace the driving gear 12 or the lead screw 13 instead of replacing two parts, reducing the maintenance cost. It should be noted that the driving gear 12 and the lead screw 13 are always coaxial and are stationary with respect to each other, i.e., the driving gear 12 or the lead screw 13 run simultaneously or stop simultaneously. However, the driving gear 12 and the lead screw 13 may be fixed to each other by means of such as riveting, which is not limited in the present disclosure, in which the fixing methods that play a role of reliable fixation all fall within the scope of protection of the present disclosure. In a possible implementation of the present disclosure, the driving gear 12 may preferably be worm gear, which is simple in structure and provides a high degree of transmission reliability.

Specifically, as shown in FIG. 2, the driving mechanism 1 further includes a bearing 11. The bearing 11 is provided on an end of the driving mechanism 1 and is positioned on a side of the driving gear 12 distal to the push rod 16, so that the driving mechanism 1 may be rotated with respect to the housing 2. It should be noted that the provision of the bearing 11 is only an optional implementation and is not limited to a bearing connection, which is not specifically limited in the present disclosure, in which the parts that play a role of rotational connection all fall within the scope of protection of the present disclosure. Preferably, in a possible implementation of the present disclosure, copper sleeves may also be used to replace bearings 11, saving cost.

Specifically, as shown in FIGS. 1-2, a protective sleeve 5 is sheathed out of the push rod 16. In the present embodiment, the housing 2 is relatively short, while an end of the protective sleeve 5 is fixed in the accommodating chamber 23; an opposite end of the protective sleeve 5 is protruded out of an end surface of the housing 2, crossing over an end of the lead screw 13 distal to the motor 4, thereby achieving effective covering and protection of the driving mechanism 1, in particular the lead screw 13 and part of the push rod 16. Additionally, a limiting support member may be provided on an end of the protective sleeve 5 proximal to the capping head 17, which supports the protective sleeve 5 to an outer periphery of the push rod 16, and also assists in positioning during assembly, and also facilitates force application to ensure that the opposite end of the protective sleeve 5 is securely fastened to the housing 2. In a possible implementation of the present disclosure, the protective sleeve 5 may be made of aluminum tube as an option for a high degree of lightness.

Specifically, as shown in FIGS. 1-2, in the present embodiment, the lead screw 13 is provided with a fixing member 14. In an axial direction of the lead screw 13, the fixing member 14 is positioned between the driving gear 12 and the nut 15 to play a role of connection and fixation. An interior periphery of the fixing member 14 is supported on an outer side of the lead screw 13. An exterior part of the fixing member 14 is provided with contact surfaces on both sides, one of which is facing towards the driving gear 12 to match the contact with an interior structure of the housing 2 to achieve the contact fixation, and the other of which is facing towards the push rod 16 to match the contact with an end surface structure of the protective sleeve 5, so that the cooperation of both contact surfaces during assembly allows the fixing member 14 to be fixedly connected to the interior periphery of the housing 2 as well as to the end face of the protective sleeve 5 simultaneously, providing a good connection reliability.

Specifically, as shown in FIG. 2, the housing 2 includes a first protective housing 21 and a second protective housing 22, in which the first protective housing 21 is fixedly connected to the second protective housing 22, so that an accommodating chamber 23 is enclosed by an interior surface of the first protective housing 21 and an interior surface of the second protective housing 22. Additionally, the fixing connection between the first protective housing 21 and the second protective housing 22 may adopt a bolted connection as shown in FIG. 2 or a more firmly welded one, which is not limited in the present disclosure, in which the structures that achieve a role of reliable connection fall within the scope of protection of the present disclosure.

Specifically, the motor driving structure provided in the present embodiment further includes a switch assembly 3, in which the switch assembly 3 includes a fixing plate 3 and two control switches 32. The control switch 32 is provided on the fixing plate 31, and the entire switch assembly 3 is mounted on the protective sleeve 5 by the fixing plate 31. When assembling the protective sleeve 5, an end of the fixing plate 31 is then mounted into the second protective housing 22, and the control switch 32 is used to control a rotation of the driving mechanism 1. Additionally, in another possible implementation of the present disclosure, an additional control switch 32 may be provided for controlling the driving mechanism 1 to make an emergency stop, to avoid damage to the motor driving structure in case of an unexpected situation, prolonging the service life thereof.

Provided in the present embodiment is also a motor driving device, as shown in FIGS. 1-2, including a motor 4 for providing power to a driving mechanism 1 and a motor driving structure mentioned above, in which an output end of the motor 4 is provided with an output shaft 41, and the second protective housing 22 is provided with a perforation correspondingly for passing through the output shaft 41, so as to achieve the engagement between the output shaft 41 and the driving gear 12 and achieve the power transmission from the motor 4 to the driving mechanism 1. As shown in FIG. 2, when the driving gear 12 is a worm gear, the output shaft 41 may correspondingly be set as a worm, so that the worm and the worm gear are well cooperated with each other, which transmits the power with high stability. Additionally, in a possible implementation of the present disclosure, the motor driving device may be applied to furniture such as sofas and seats. For example, the push rod 16 may be connected to the headrest, so that the motor 4 may drive the push rod 16 to push the headrest of the sofas or seats when activated. In another possible implementation of the present disclosure, the motor driving device may also be applied to furniture of lying type such as motorized beds. For example, the push rod 16 is used to push a back frame of a bed or a leg frame of a bed.

Preferably, as shown in FIG. 1, the motor 4 is provided perpendicular to the driving mechanism 1, i.e., an axial direction of the output shaft 41 is perpendicular to an axial direction of the lead screw 13. A protective cover shell may be provided on an end of the motor 4 distal to the driving mechanism 1 and is sheathed on an exterior surface of the motor 4 to protect the motor 4, preventing unexpected wear and tear of the motor 4, prolonging the service life of the motor 4. As shown in FIGS. 1-2, when the strength of the motor is sufficient, it is also possible to complete the assembly without a protective cover shell.

As is evident from the present embodiment, the present disclosure has the following beneficial effects:

1. The push rod and the nut are integrally molded, or the push rod and the capping head are integrally molded, or all of them are integrally molded as one unit, which allows the processing to eliminate the necessity of processing threads and other connecting structures at the connection place, which reduces the machining difficulty and shortens the machining time for individual parts. For the assembly of the motor driving structure, the total number of parts to be assembled is reduced, which accelerates the assembly efficiency and comprehensively improves the overall production efficiency of the motor driving device.

2. The parts that are able to be integrally molded among the push rod, nut and capping head are made of plastic to realize integral injection molding, which not only avoids friction and jamming during the assembly of the traditional metal parts, but also reduces the noise that may be generated by the movement of the metal parts during operation of the motor driving device, and improves the user's satisfaction.

Figure 3:
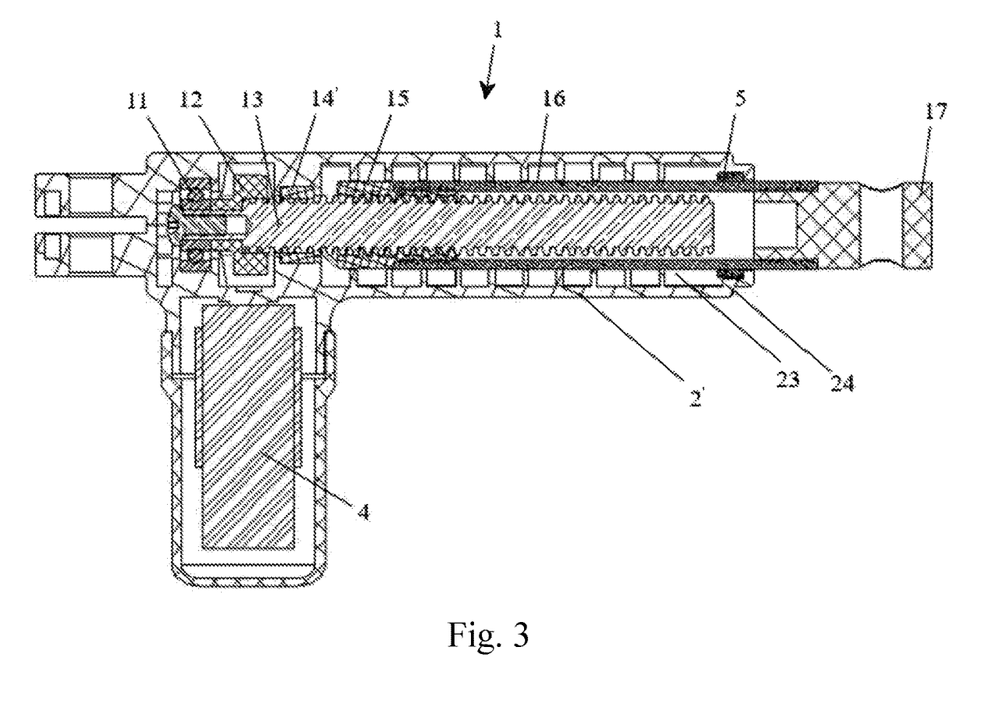
FIG. 3 is a structural cross-sectional diagram of the motor driving structure of another implementation in the present disclosure.
Figure 4:
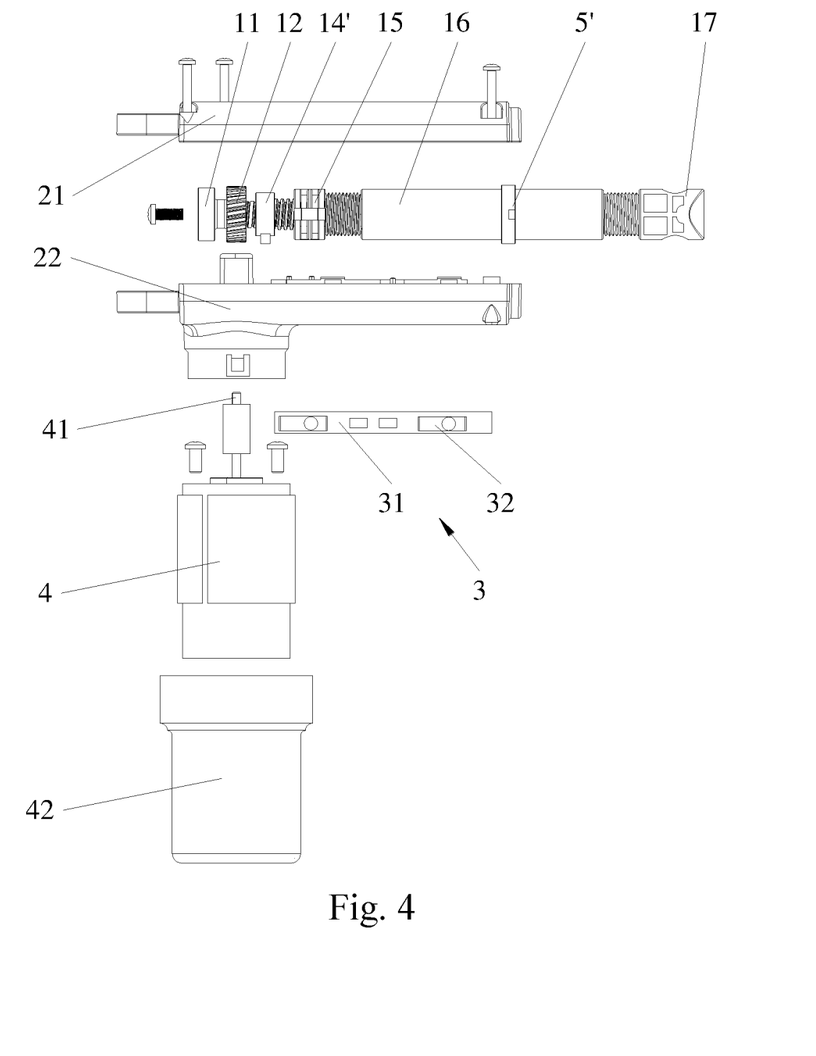
FIG. 4 is an exploded view of the motor driving structure in FIG. 3.

Considering that the existing motor driving device suffers from complex structure, large number of parts and inconvenient assembly, provided in the present embodiment is further a motor driving structure. As shown in FIGS. 3-4, the motor driving structure includes a driving mechanism 1 and a reinforcing protective assembly 2', in which the driving mechanism 1 is used to be drivingly connected to an end of a motor 4 and is provided in the reinforcing protective assembly 2'. An interior of the reinforcing protective assembly 2' is an accommodating chamber 23 used to accommodate the driving mechanism 1, and an outer periphery contour of the driving mechanism 1 matches an inner periphery contour of the accommodating chamber 23, which facilitates a better guiding role during assembly, allows for rapid positioning and improves assembly efficiency.

Specifically, as shown in FIG. 3, FIG. 3 is a structural cross-sectional diagram of the motor driving structure of the present embodiment, in which the driving mechanism 1 includes a lead screw 13 and a push rod 16. An end of the lead screw 13 is used to be drivingly connected to an output end of the motor 4, so that the motor 4 drives the lead screw 13 to rotate when activated. On an opposite end of the lead screw 13, the push rod 16 is connected to the lead screw 13 by means of internal and external threads. When the lead screw 13 rotates, it also drives the push rod 16 to move. Moreover, an end of the push rod 16 is protruded out of an end of the reinforcing protective assembly 2', so that the push rod 16 outputs the power.

In the present embodiment, the driving mechanism 1 further includes a driving gear 12 used to engage with an output end of the motor 4 to transmit the power of the motor 4. However, in the existing drive mechanism 1, a fixing structure such as a fixing buckle is often provided between the driving gear 12 and the lead screw 13 to play a role in connecting and fixing, which increases the number of parts of the entire driving mechanism 1, increases the number of assembly steps, and reduces the assembly efficiency, and the connection of the fixing buckle is prone to loosening during rotation of the driving mechanism 1, which is not conducive to improving the reliability and stability of the driving mechanism 1. The driving gear 12 provided by the present embodiment is coaxially connected to the lead screw 13 directly, in which the driving gear 12 is directly sheathed on the lead screw 13 to be secured without setting additional parts to connect and fix between them, which, on the one hand, simplifies the structure and improves the assembly efficiency, and, on the other hand, avoids instability of the driving mechanism 1 caused by adding additional parts. Preferably, in a possible implementation of the present disclosure, the driving gear 12 may be threaded to an end of the lead screw 13, which provides a simple and rapid connection, and the detachable threaded connection is conducive to replacing parts during maintenance, since it is sufficient to only replace the driving gear 12 or the lead screw 13 instead of replacing two parts, reducing the maintenance cost. It should be noted that, the driving gear 12 and the lead screw 13 are always coaxial and are stationary with respect to each other, i.e., the driving gear 12 or the lead screw 13 run simultaneously or stop simultaneously. However, the driving gear 12 and the lead screw 13 may be fixed to each other by means of such as riveting, which is not limited in the present disclosure, in which the fixing methods that play a role of reliable fixation all fall within the scope of protection of the present disclosure. In a possible implementation of the present disclosure, the driving gear 12 may be preferably worm gear, which is simple in structure and provides a high degree of transmission reliability.

Specifically, as shown in FIG. 4, the driving mechanism 1 further includes a bearing 11, a second support ring 14', a nut 15, and a first support ring 5'. The bearing 11 is provided on an end of the driving mechanism 1 and is positioned on a side of the driving gear 12 distal to the push rod 16, so that the driving mechanism 1 may be rotated with respect to the reinforcing protective assembly 2'. It should be noted that the provision of the bearing 11 is only an optional implementation and is not limited to a bearing connection, which is not specifically limited in the present disclosure, in which the parts that play a role of rotational connection all fall within the scope of protection of the present disclosure. Preferably, in a possible implementation of the present disclosure, copper sleeves may also be used to replace bearings 11, saving cost.

Specifically, the second support ring 14' is provided on the lead screw 13 and is in an axial direction of the lead screw 13. The second support ring 14' is also positioned between the nut 15 and the driving gear 12, playing a limiting role in preventing the nut 15 from contacting the driving gear 12 causing the driving mechanism 1 to rotate poorly or to make noise due to over-rotation while connecting the nut 15 to the lead screw 13. Also, the second support ring 14' is supported between the lead screw 13 and the reinforcing protective assembly 2' to play a role in support, which is conducive to rapid positioning of the relative position between the lead screw 13 and the reinforcing protective assembly 2'. Additionally, in a possible implementation of the present disclosure, when the support strength between the reinforcing protective assembly 2' and the lead screw 13 is sufficient or the positioning condition is good, the second support ring 14' may also not be provided, which further improves the efficiency. The nut 15 is positioned on an end of the lead screw 13 and the push rod 16. The lead screw 13 and the push rod 16 are fixedly secured by a threaded connection, which provides a high degree of fixation reliability. In a possible implementation of the present disclosure, the nut 15 may be provided to be integrated with the push rod 16, which further accelerates the production and assembly efficiency.

Specifically, as shown in FIG. 3, the capping head 17 is positioned on an end of the push rod 16 distal to the motor. The capping head 17 may be integrated with the push rod 16. Therefore, there are three types of connection forms for the nut 15, the push rod 16 and the capping head 17 as follows: the nut 15 is integrated with the push rod 16, but the push rod 16 is not integrated with the capping head 17; the push rod 16 is integrated with the capping head 17, but the push rod 16 is not integrated with the nut 15; and the nut is integrated with the push rod and the push rod 16 is also integrated with the capping head 17, i.e., the nut 15, the push rod 16, and the capping head 17 are formed integrally, which greatly accelerates the assembly efficiency.

Specifically, a support part 24 is provided on an end of the reinforcing protective assembly 2' distal to the motor 4. Optionally, the support part 24 may be a structure that is integrated with the reinforcing protective assembly 2', which belongs to a part of the reinforcing protective assembly 2', and is positioned on an interior periphery of the reinforcing protective assembly 2', i.e., is equivalent to the peripheral wall on an end of the accommodating chamber 23 distal to the motor 4. An interior of the support part 24 is supported to an exterior surface of the push rod 16, which may achieve precise positioning and effective protection. In a possible implementation of the present disclosure, the support part 24 may be provided as a first support ring 5' provided between the push rod 16 and the reinforcing protective assembly 2', and the first support ring 5' is positioned on a side distal to the driving gear 12, so as to ensure that the first support ring 5' may play a sufficient role in support. The first support ring 5' is also positioned on an end of the reinforcing protective assembly 2', so that an interior of the first support ring 5' is supported to an exterior surface of the push rod 16 and an exterior periphery thereof is supported to an interior surface of the reinforcing protective assembly 2', which is conducive to rapid positioning of the relative position between the push rod 16 and the reinforcing protective assembly 2' during assembly to achieve rapid assembly. It should be noted that the positioning of the relative position between the push rod 16 and the reinforcing protective assembly 2' is actually a restriction of the relative position therebetween in a peripheral direction so as to prevent the push rod 16 from swaying relative to the reinforcing protective assembly 2', but not to restrict a movement of the push rod 16 in an axial direction. Both the first support ring 5' and the second support ring 14' play a guiding role, which is conducive to rapid positioning during installation and improving the assembly efficiency. Preferably, in order to ensure balance during assembly, the first support ring 5' is as far away from the driving gear 12 as possible, as long as the first support ring 5' is capable of contacting the reinforcing protective assembly 2'. Correspondingly, as shown in FIG. 3, a length of the accommodating chamber 23 for accommodating a part of the driving mechanism 1 is not less than a distance from the support part 24 to the bearing 11, i.e., not less than a distance from the first support ring 5' to the bearing 11, so as to ensure that the first support ring 5' is always supported to an interior of the reinforcing protective assembly 2'.

Specifically, as shown in FIG. 3, the reinforcing protective assembly 2' is provided with an extension end positioned on an end of the reinforcing protective assembly 2' distal to the motor 4, and an end surface of the extension end is protruded out of an end surface of an end of the lead screw 13, so as to ensure that the reinforcing protective assembly 2' may replace the relatively short protective assembly, protective sleeve and fixing buckle of the prior art, which may better protect the driving mechanism 1, especially protect the lead screw 13 and a part of the push rod 16, reducing the number of the parts and the structural complexity, which is conducive to improving the production efficiency. Additionally, the cooperation between the elongated reinforcing protective assembly 2' and the first support ring 5 may effectively restrict the coaxiality of the various parts in the driving mechanism 1 while playing a role in support and protection, which ensures the stability of operation of the driving mechanism 1, reducing the possibility of failure and thus reducing maintenance costs. In other implementations, the end surface of the extension end may be configured to be aligned with the end surface of the lead screw 13 according to actual demand. In such a case, the position of the first support ring 5' may lag slightly behind the end surface of the lead screw 13, saving material while ensuring the strength thereof is sufficient.

Specifically, as shown in FIG. 4, the reinforcing protective assembly 2' includes a first protective housing 21 and a second protective housing 22, in which the first protective housing 21 is fixedly connected to the second protective housing 22, so that the accommodating chamber 23 is enclosed by an interior surface of the first protective housing 21 and an interior surface of the second protective housing 22. In the present embodiment, the reinforcing protective assembly 2' extends from an end of the driving mechanism 1 where the bearing 11 is provided to a middle of the push rod 16, i.e., a position where the first support ring 5' is provided, so that the reinforcing protective assembly 2' is elongated and structural strength of the reinforcing protective assembly 2' is enhanced. Compared to the existing method of combining protection by means of an upper shell, a lower shell, and an additional protective cover, the protection of the driving mechanism 1 is achieved by adopting only the first protective housing 21 and the second protective housing 22, without reducing structural strength, having a simpler structure and reducing the number of parts, which is conducive to saving time for the production of parts, and it is unnecessary to consider the assembly sequence of the protective cover, which greatly simplifies the assembly process and further accelerates the production and assembly efficiency. Additionally, in a possible implementation of the present disclosure, the reinforcing protective assembly 2' is optionally made of plastic, which further improves the lightweight degree of the motor driving structure and saves costs compared to the existing aluminum tube protective sleeve. Moreover, the fixing connection between the first protective housing 21 and the second protective housing 22 may adopt a bolted connection as shown in FIG. 4 or a more firmly welded one, which is not limited in the present disclosure, in which the structures that achieves a reliable connection all fall within the scope of protection of the present disclosure.

Specifically, as shown in FIG. 4, the motor driving structure provided in the present embodiment further includes a switch assembly 3, in which the switch assembly 3 includes a fixing plate 3 and two control switches 32. The control switch 32 is provided on the fixing plate 31, and the entire switch assembly 3 is fixed on the second protective housing 22 by the fixing plate 31, and the control switch 32 is used to control a rotation of the driving mechanism 1. Additionally, in another possible implementation of the present disclosure, an additional control switch 32 may be provided for controlling the driving mechanism 1 to make an emergency stop, to avoid damage to the motor driving structure in case of an unexpected situation, prolonging the service life thereof.

Figure 6:
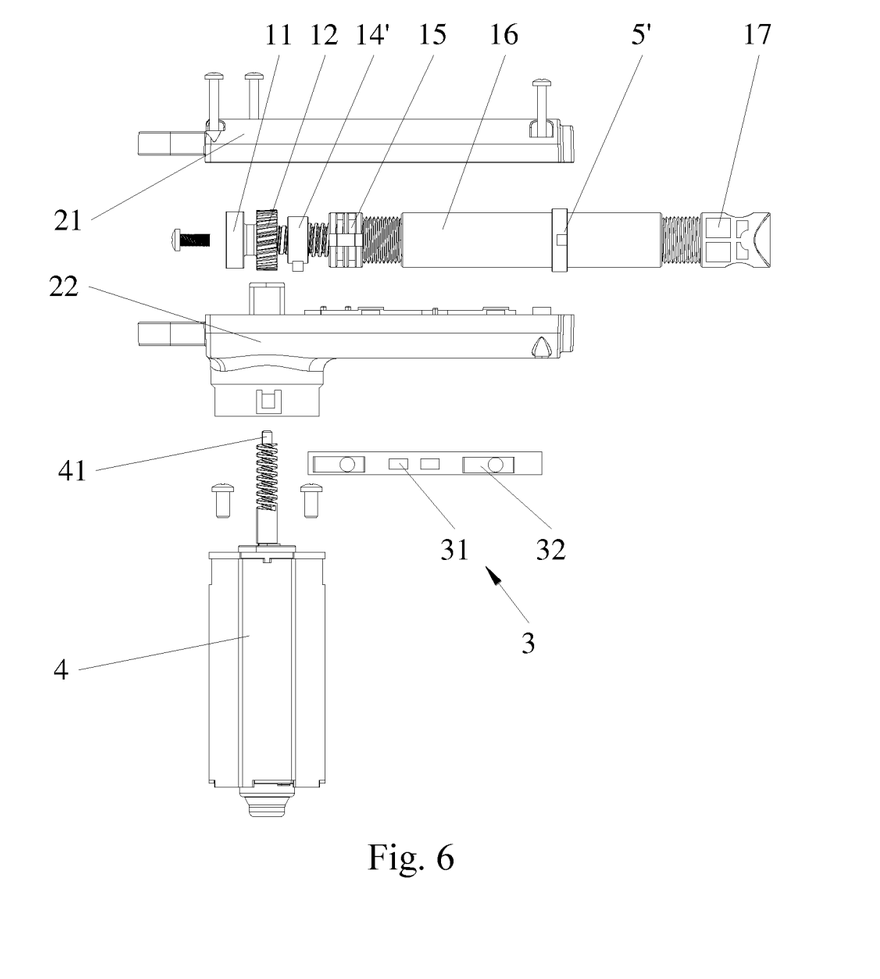
FIG. 6 is an exploded view of the motor driving structure in FIG. 5.

Provided in the present embodiment is also a motor driving device, including a motor 4 for providing power to a driving mechanism 1 and a motor driving structure mentioned above, in which an output end of the motor 4 is provided with an output shaft 41, and the second protective housing 22 is provided with a perforation correspondingly for passing through the output shaft 41, so as to achieve the engagement between the output shaft 41 and the driving gear 12 and achieve the power transmission from the motor 4 to the driving mechanism 1. As shown in FIG. 6, when the driving gear 12 is a worm gear, the output shaft 41 may correspondingly be set as a worm, so that the worm and the worm gear are well cooperated with each other, which transmits the power with high stability. Additionally, in a possible implementation of the present disclosure, the motor driving device may be applied to furniture such as sofas and seats. For example, the push rod 16 may be connected to the headrest, so that the motor 4 may drive the push rod 16 to push the headrest of the sofas or seats when activated. In another possible implementation of the present disclosure, the motor driving device may also be applied to furniture of lying type such as motorized beds. For example, the push rod 16 is used to push a back frame of a bed or a leg frame of a bed.

Figure 5:
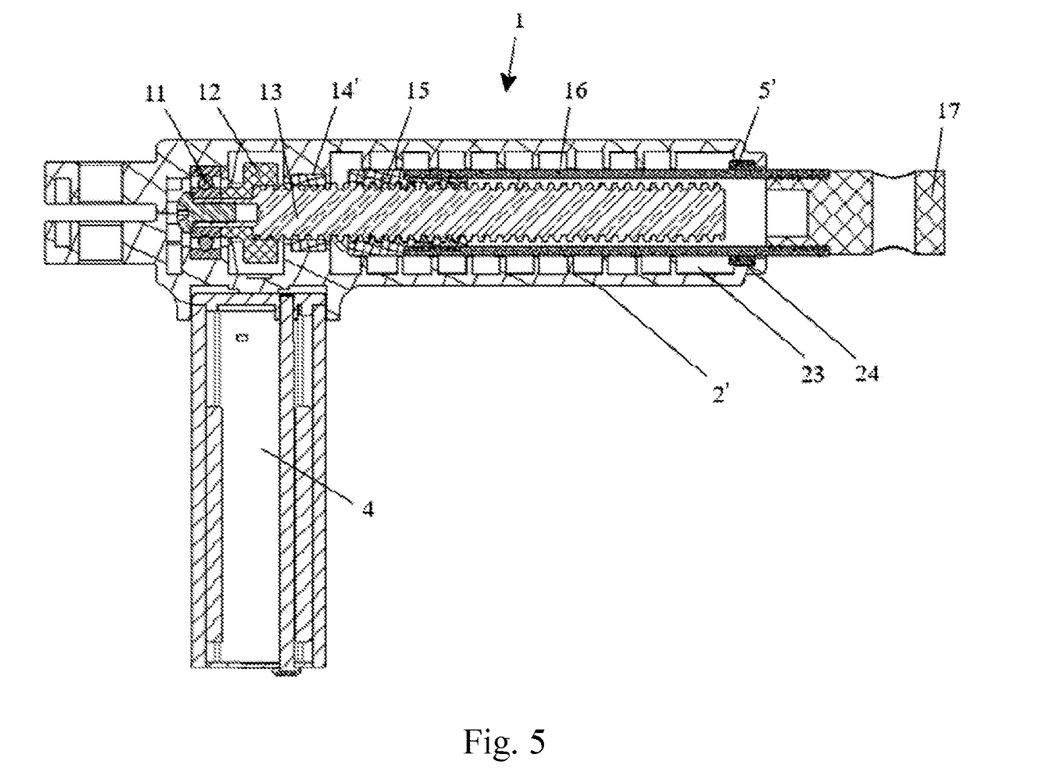
FIG. 5 is a structure cross-sectional diagram of the motor driving structure of a further implementation in the present disclosure.

Preferably, as shown in FIG. 5, the motor 4 is provided perpendicular to the driving mechanism 1, i.e., an axial direction of the output shaft 41 is perpendicular to an axial direction of the lead screw 13. As shown in FIG. 3, a protective cover shell 42 may be provided on an end of the motor 4 distal to the driving mechanism 1 and is sheathed on an exterior surface of the motor 4 to protect the motor 4, preventing unexpected wear and tear of the motor 4, prolonging the service life of the motor 4. As shown in FIGS. 5-6, when the strength of the motor is sufficient, it is also possible to complete the assembly without a protective cover shell 42.

As is evident from the present embodiment, the present disclosure has the following beneficial effects:

1. The existing protective sleeve sheathed out of the push rod and the fixing buckle are removed, and the elongated reinforcing protective assembly is used to replace the original protective cover, the fixing buckle and other parts, and the elongated reinforcing protective assembly is directly used to cover the entire driving mechanism to protect it, which reduces the number of parts and the complexity of the parts structure, which is conducive to improving the production efficiency. Moreover, the cooperation between the reinforcing protective assembly and the first support ring effectively limits the coaxiality of the parts in the driving mechanism while playing the role of support and protection.

2. The reinforcing protective assembly with the accommodating chamber is configured as a relatively long structure, providing a high degree of integration, which is more conducive to wrapping around the driving mechanism and improving the strength of the entire motor driving structure.

3. The first support ring and the second support ring effectively play a guiding role in limiting the relative position between the push rod and the reinforcing protective assembly, which is conducive to rapid positioning during installation.

The above description is only some of the embodiments of the present disclosure and is not intended to limit the present disclosure. Those skilled in the art should understand that the present disclosure will be subject to various changes and improvements. Any modifications, equivalent substitutions, and improvements made in accordance with the present disclosure fall within the scope of the protection claimed by the present disclosure.

The invention claimed is:

1. A motor driving structure, comprising a driving mechanism, wherein the driving mechanism comprises a lead screw, a nut, a push rod, and a capping head; the lead screw is used to be drivingly connected with an output end of a motor; the nut is threaded to the lead screw and used for connecting the lead screw with the push rod;

the push rod is positioned between the nut and the capping head; the push rod is integrally formed with the nut and/or the capping head; the push rod is made of a plastic material; and the nut integrated with the push rod and/or the capping head integrated with the push rod are/is made of a plastic material;

the driving mechanism further comprises a driving gear; the driving gear is used to engage with the motor; the driving gear is further coaxially connected to the lead screw; the driving gear is directly sheathed on the lead screw;

the driving mechanism further comprises a bearing; the bearing is provided on an end of the driving mechanism; and the bearing is directly positioned on an end of the driving gear distal to the push rod;

the motor driving structure further comprises a housing; the push rod is further provided with a protective sleeve on an outer periphery thereof; the driving mechanism further comprises a fixing member; an interior periphery of the fixing member is supported on an outer side of the lead screw; and an exterior part of the fixing member is simultaneously supported on an interior periphery of the housing and an interior periphery of the protective sleeve.

2. The motor driving structure according to claim 1, wherein the push rod is injection molded integrally with the nut and/or the capping head.

3. The motor driving structure according to claim 1, wherein an interior of the housing is provided with an accommodating chamber; at least a part of the driving mechanism is provided within the accommodating chamber; the housing comprises a first protective housing and a second protective housing; the first protective housing is fixedly connected with the second protective housing; and the accommodating chamber is enclosed by an interior surface of the first protective housing and an interior surface of the second protective housing.

4. The motor driving structure according to claim 3, wherein an end of the protective sleeve is fixed in the accommodating chamber; and an opposite end of the protective sleeve is protruded out of an end surface of the housing.

5. The motor driving structure according to claim 4, wherein the protective sleeve is protruded out of an end of the lead screw distal to the motor.

6. A motor driving device, comprising a motor and a motor driving structure, wherein the motor driving structure comprises a driving mechanism, wherein the driving mechanism comprises a lead screw, a nut, a push rod, and a capping head; the lead screw is used to be drivingly connected with an output end of the motor; the nut is threaded to the lead screw and used for connecting the lead screw with the push rod;

the push rod is positioned between the nut and the capping head; the push rod is integrally formed with the nut and/or the capping head; the push rod is made of a plastic material;

the nut integrated with the push rod and/or the capping head integrated with the push rod are/is made of a plastic material;

the driving mechanism further comprises a driving gear; the driving gear is used to engage with the motor; the driving gear is further coaxially connected to the lead screw; the driving gear is directly sheathed on the lead screw;

the driving mechanism further comprises a bearing; the bearing is provided on an end of the driving mechanism; and the bearing is directly positioned on an end of the driving gear distal to the push rod; and wherein the motor is used to provide power to the driving mechanism; an output end of the motor is provided with an output shaft; a housing is provided out of the driving mechanism; the housing is provided with a perforation; the output shaft is passed through the perforation to be drivingly connected to the lead screw;

the push rod is further provided with a protective sleeve on an outer periphery thereof; the driving mechanism further comprises a fixing member; an interior periphery of the fixing member is supported on an outer side of the lead screw; and an exterior part of the fixing member is simultaneously supported on an interior periphery of the housing and an interior periphery of the protective sleeve.

7. A motor driving structure, comprising a driving mechanism and a reinforcing protective assembly; an interior of the reinforcing protective assembly is provided with an accommodating chamber; the driving mechanism is provided in the accommodating chamber; an outer periphery contour of the driving mechanism matches an inner periphery contour of the accommodating chamber;

the driving mechanism comprises a lead screw and a push rod; the lead screw is used to be drivingly connected with an output end of a motor; the push rod is connected to the lead screw by means of internal and external threads;

an end of the reinforcing protective assembly distal to the motor further comprises a support part; the support part is further positioned on an interior periphery of the reinforcing protective assembly; and the support part is supported on an outer side of the push rod;

the driving mechanism further comprises a driving gear; the driving gear is used to engage with the motor; the driving gear is further coaxially connected to the lead screw; the driving gear is directly sheathed on the lead screw;

the driving mechanism further comprises a bearing; the bearing is provided on an end of the driving mechanism; and the bearing is directly positioned on an end of the driving gear distal to the push rod;

the motor driving structure further comprises a housing; the push rod is further provided with a protective sleeve on an outer periphery thereof; the driving mechanism further comprises a fixing member; an interior periphery of the fixing member is supported on an outer side of the lead screw; and an exterior part of the fixing member is simultaneously supported on an interior periphery of the housing and an interior periphery of the protective sleeve.

8. The motor driving structure according to claim 7, wherein the support part is a first support ring, and the first support ring is provided between the push rod and the reinforcing protective assembly.

9. The motor driving structure according to claim 7, wherein an end of the reinforcing protective assembly distal to the motor is protruded out of an end of the lead screw distal to the motor.

10. The motor driving structure according to claim 7, wherein a length of the accommodating chamber is not less than a distance from the support part to the bearing.

11. The motor driving structure according to claim 7, wherein the reinforcing protective assembly comprises a first protective housing and a second protective housing; the first protective housing is fixedly connected to the second protective housing; the accommodating chamber is enclosed by an interior surface of the first protective housing and an interior surface of the second protective housing.

12. The motor driving structure according to claim 7, wherein the driving mechanism further comprises a capping head, and the capping head is positioned on an end of the push rod distal to the motor.

13. The motor driving structure according to claim 12, wherein the capping head and the push rod are of integral structure.

14. The motor driving structure according to claim 7, wherein the driving mechanism further comprises a nut; and the nut is used to connect the lead screw and the push rod.

15. The motor driving structure according to claim 14, wherein the driving mechanism further comprises a second support ring provided on the lead screw, and the second support ring is positioned between the driving gear and the nut.

16. The motor driving structure according to claim 14, wherein the nut and the push rod are of integral structure.

* * * * *